United States Patent [19]

Nishiyama

[11] Patent Number: 4,486,205
[45] Date of Patent: * Dec. 4, 1984

[54] POWDERY DUST SEPARATING APPARATUS IN DUST COLLECTOR

[76] Inventor: Shinroku Nishiyama, 11-4, Komei-Cho, Takarazuka, Hyogo, Japan, 665

[*] Notice: The portion of the term of this patent subsequent to May 1, 2001 has been disclaimed.

[21] Appl. No.: 580,363

[22] Filed: Feb. 15, 1984

Related U.S. Application Data

[63] Continuation of Ser. No. 418,169, Sep. 14, 1982, Pat. No. 4,445,913.

[30] Foreign Application Priority Data

Feb. 26, 1982 [JP] Japan .......................... 57-28098[U]

[51] Int. Cl.³ .............................................. B01D 46/04
[52] U.S. Cl. ...................................................... 55/302
[58] Field of Search .................... 55/273, 96, 302, 379, 55/291

[56] References Cited

U.S. PATENT DOCUMENTS

| | | | |
|---|---|---|---|
| 3,325,979 | 6/1967 | Smith | 55/302 |
| 3,421,295 | 1/1969 | Swift et al. | 55/302 |
| 3,699,747 | 10/1972 | Kroll | 55/96 |
| 3,811,248 | 5/1974 | Lesk et al. | 55/302 |
| 3,832,832 | 9/1974 | Hoon | 55/302 |
| 4,292,053 | 9/1981 | Remillieux | 55/96 |
| 4,445,913 | 5/1984 | Nishiyama | 55/302 |

FOREIGN PATENT DOCUMENTS 2147979 3/1973 Fed. Rep. of Germany ........ 55/302

Primary Examiner—Bernard Nozick
Attorney, Agent, or Firm—Wenderoth, Lind & Ponack

[57] ABSTRACT

A powdery dust separating apparatus in a dust collector to separate powdery dust from clean gas by sucking gas containing the powdery dust into the body of the apparatus and passing this through filter members, the body being divided into a filter chamber provided with a plurality of flat box-like filter members therein, and a gas chamber to discharge the filtered gas, the gas chamber being subdivided longitudinally into gas passages with outlets to discharge filtered gas therefrom. Structure is provided to close the outlets just before the introduction of compressed air against the filter members, and at the same time introduce atmospheric air by opening atmospheric air inlets, and causing this atmospheric air to promote action as an expansion gas in addition to the compressed air, whereby the filter members are expanded rapidly and vibrated slightly so as to separate powdery dust built up on the filter members efficiently.

6 Claims, 7 Drawing Figures

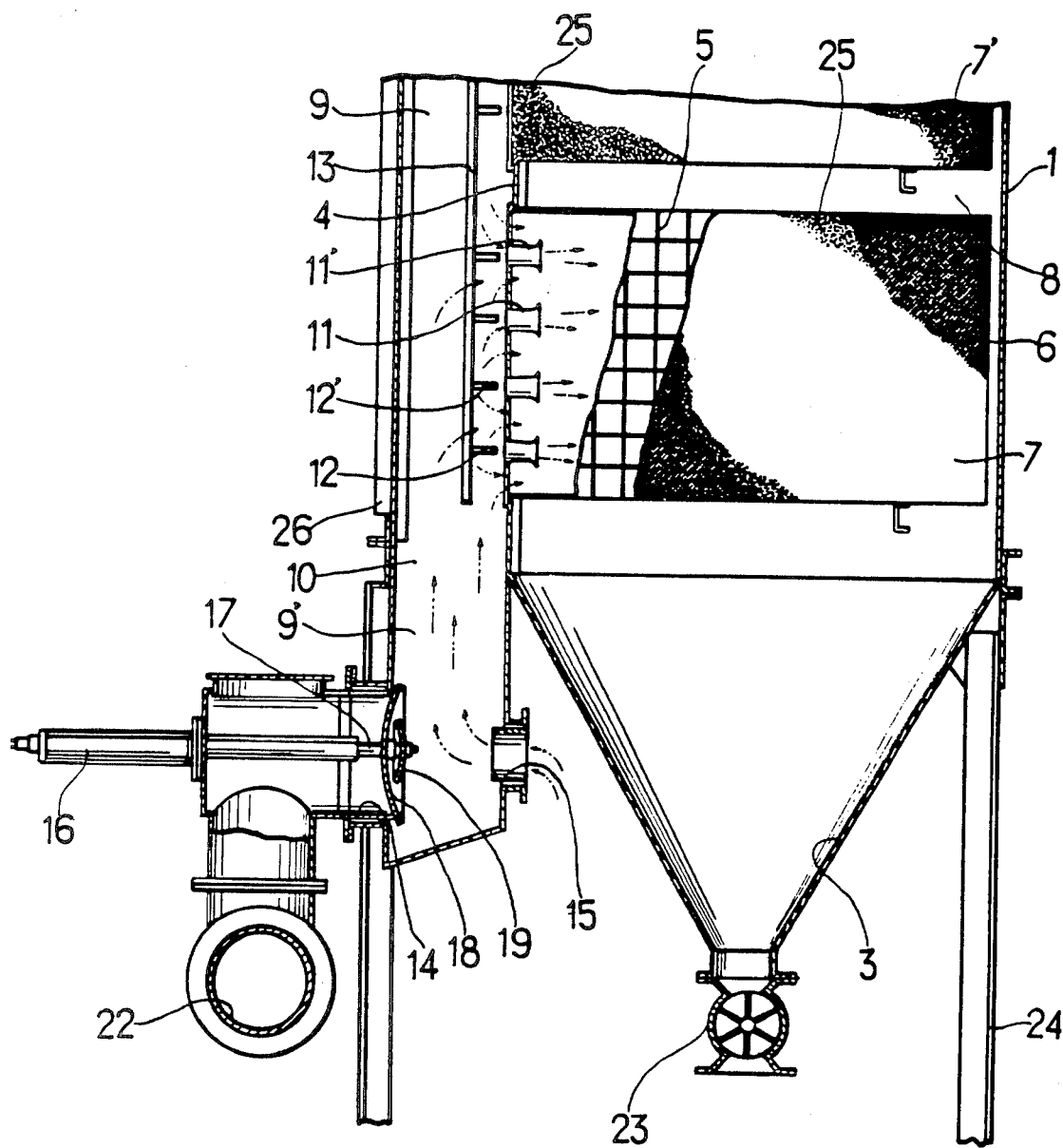

POWDERY DUST SEPARATING APPARATUS IN DUST COLLECTOR

This application is a continuation of applicant's copending application Ser. No. 418,169, filed Sept. 14, 1982 now U.S. Pat. No. 4,445,913 issued May 1, 1984.

BACKGROUND AND FIELD OF THE INVENTION

The present invention relates to an improvement in a dust collector wherein, by filtration and separation, the collection of powdery dust in general by a dust collector during the disassembly of a mold after pouring in a foundry, the removal of a product, the reclamation of casting sand, etc., or in a dust collector used to separate and collect powdery dust generated by delivery performance, vibration, etc. during various process of casting sand, the powdery dust adhering to the filter members being separated efficiently in order to prevent the lowering of filtering efficiency by the dust adhering to the outside of filter members after long periods of continuous operation.

DESCRIPTION OF THE PRIOR ART

In such a type of dust collector used to separate and collect powdery dust from a gas by a treatment purifying the gas containing the powdery dust, heretofore a filter chamber has been provided in the dust collector in order to pass gas containing powdery dust in the prescribed direction, and gas filtered and treated by passing through the filter members inserted into said filter chamber has been discharged from the outlet of the flow passage, and in order to separate powdery dust for collection from the outside faces of the filter members, bursts of compressed air have been ejected intermittently against the inside faces of said filter members so as to expand the filter members rapidly and to vibrate them slightly in order to separate the powdery dust collected on the outside faces. However, even if bursts of compressed air are ejected from the inside of the filter members toward the outside against the gas flow within said filter chamber where gas containing powdery dust is flowing always from the outside faces of the filter members toward the inside, since it is against the main gas flow within the dust collector, a pressure loss in the ejection force of the compressed air is caused bringing a fall in the ejection force and a drop in the expanding and vibrating action of the filter members so that the efficiency of separating powdery dust is reduced. Accordingly, since the ejection force of the air must be increased to counter said pressure losses in ejection force in order to separate the powdery dust efficiently, it is necessary to enlarge the capacity of the compressor used as the air ejecting apparatus outside the dust collector.

Recently, trials have been made to correct the above described defect wherein compressed air is ejected rapidly after the gas outlet is closed once so as to stop the gas flow in the dust collector flowing toward the outlet in order to raise the ejection efficiency of the compressed air, but these trials also could not raise the efficiency of separating powdery dust because of the following reason. Even if the outlet is closed instantaneously, the gas flow within the dust collector is not stopped completely. Moreover in the gas passage within the dust collector, the densities of the filtered gas and the gas to be filtered differ such that the air density within the gas passage where compressed air is ejected is less, so that even if compressed air is ejected instantaneously from here, the ejected compressed air and the remaining gas flow within the dust collector is offset so that an increase in the separating efficiency cannot be attained.

SUMMARY OF THE INVENTION

The purpose of the present invention is to provide a powdery dust separating apparatus in a dust collector wherein a complete dust collection treatment can be attained at extremely high efficiency with a small capacity compressor by performing said powdery dust separating without causing pressure losses in the ejection force of the compressed air against the gas containing powdery dust flowing in the prescribed direction, moreover separating the powdery dust adhering to filter members efficiently and surely.

The present invention is characterized in that, in a dust collector having main components comprising individual gas flowing means to pass gas containing powdery dust in the prescribed direction, filter members are positioned against the gas flowing by said means so as to separate and absorb powdery dust delivered with the gas from the gas, a means to inject compressed air into the interior of the filter members at prescribed time intervals, and opening and closing means for valves arranged so that each valve is opened and closed alternately to provide an outlet for gas and an atmospheric air inlet at the lower end of each individual gas passage opposite each other, the passages of the gas filtered by the filter members are each divided independently, and outlets to inject compressed air within each gas flowing passage are located so as to open into the end of each filter member. The outlet for filtered gas is closed as compressed air is ejected, and atmospheric air is introduced at the same time so that the air density within said gas passage is made identical to that of the remaining gas flow within the filter chamber, and compressed air is pressurized by the drag of this atmospheric air as compressed air is ejected. Thus, since an increase in the efficiency of separating powdery dust is intended by the efficient expanding and slight vibrating of the filter members and also by the force of the injected compressed air being utilized effectively, as opposed to the system in which high pressure compressed air is injected against the flow of the gas as used in previous dust collectors, the purpose can be attained fully with low pressure compressed air. Accordingly the capacity of the compressor may be reduced, this being extremely useful in producing energy-saving.

BRIEF DESCRIPTION OF THE DRAWINGS

FIG. 7 is a partial enlarged longitudinal sectional view of the body of the dust collector during the introduction of atmospheric air.

DETAILED DESCRIPTION OF A PREFERRED EMBODIMENT

Figure 1:
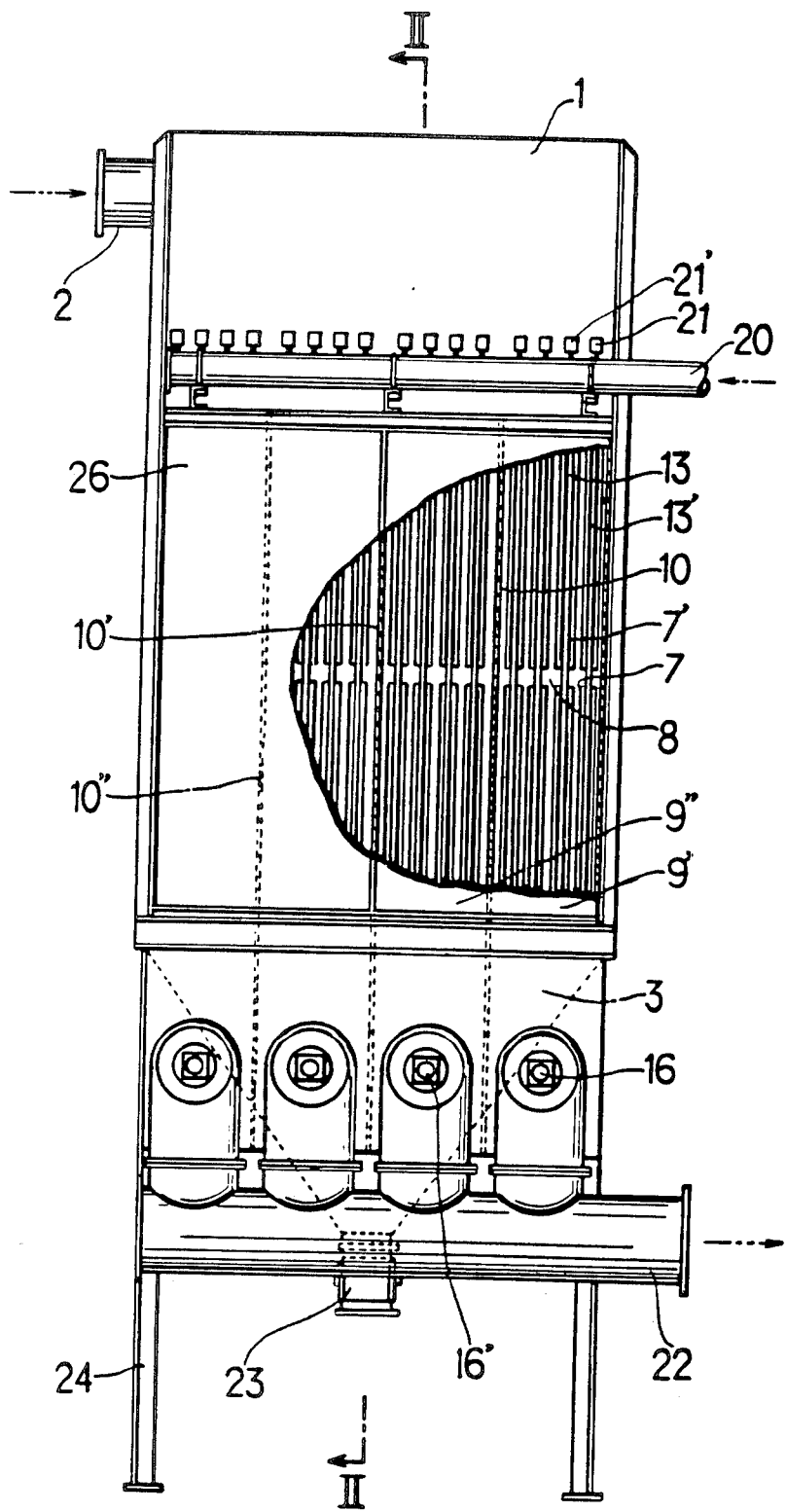
FIG. 1 is a partially sectioned front view of a dust collector equipped with the present invention.
Figure 2:
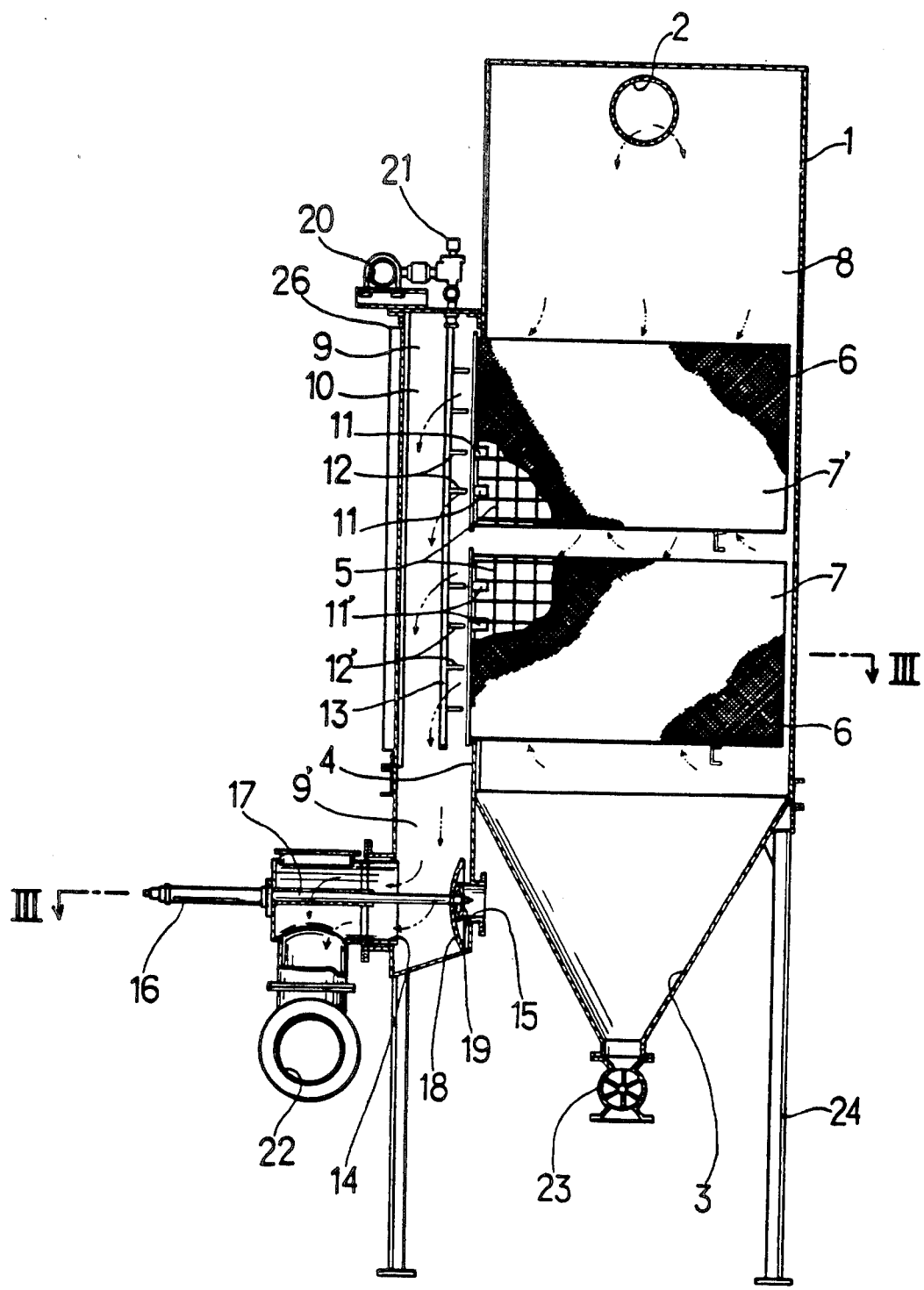
FIG. 2 is a longitudinal sectional view taken along the line II-II in FIG. 1.
Figure 3:
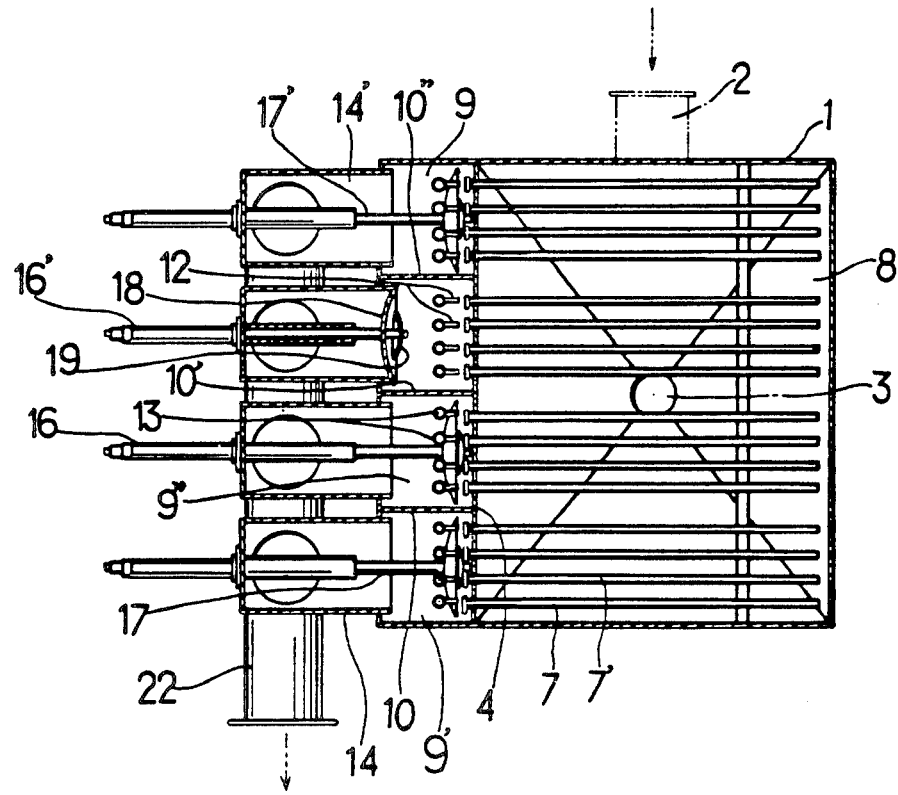
FIG. 3 is a cross-sectional view taken along the line III-III in FIG. 2.
Figure 4:
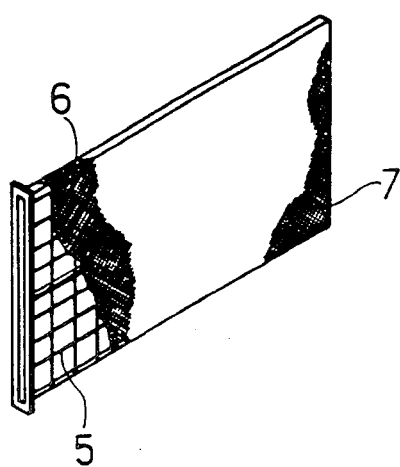
FIG. 4 is a partially sectioned perspective view of a filter member.
Figure 5:
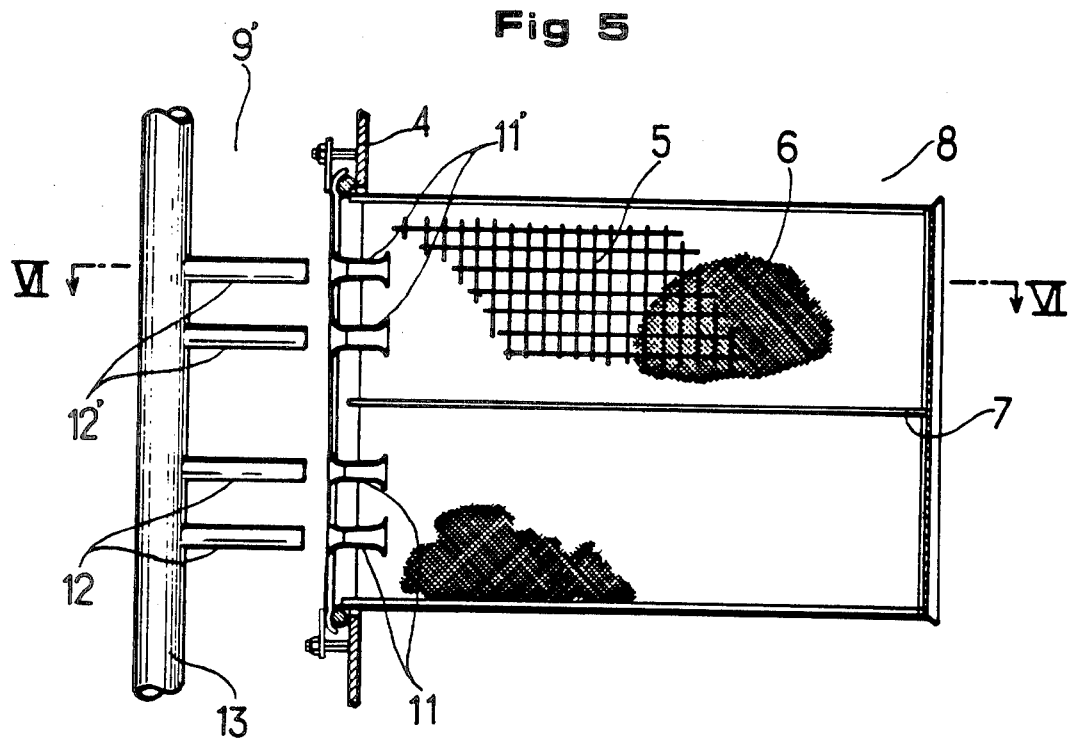
FIG. 5 is a partially sectioned view showing the relationship between a filter member and the corresponding compressed air outlets.

An embodiment of the present invention is explained below with reference to the drawings. A dust collector body (1) is provided with an open suction pipe (2) to suck in gas containing powdery dust arranged at its upper end, and a powdery dust disposal chute (3) to discharge the separated powdery dust arranged at its lower end. Flat box-like filter members (7), (7'), ... each comprising a filter cloth (6) spread over the outer face of a filter frame (5), are inserted into a vertical partition (4) in the side of the dust collector body (1) in a laterally parallel arrangement stacked in a plurality of layers, and the interior of the dust collector body (1) is divided into a filter chamber (8) and a gas chamber (9), and a plurality of gas passages (9'), (9") ... are formed by providing an appropriate number of separators (10), (10'), (10") ... within the gas chamber (9) so as to subdivide this chamber longitudinally, compressed air pipes (13), (13'), ... each having four protruding compressed air outlets (12), (12'), are arranged within each gas passage (9'), (9"), ... facing toward corresponding venturi tubes (11), (11'), ... attached to openings in the forward end of the filter members (7), (7') ... at constant spacing, and gas outlets (14), (14') ... are provided at the lower end of each gas passage (9'), (9") ... respectively, and also atmospheric air inlets (15), (15') ... are provided opposite to said gas outlets (14), (14'), ... respectively, with outlet closing valves (18), (18'), ... respectively, and atmospheric air inlet closing valves (19), (19') ... respectively attached to the end of piston rods (17), (17') ... respectively of, air cylinders (16), (16') ... adjacent to each other but opposed so as to open and close each inlet (15), (15') ... or outlet (14), (14'), ... respectively, thereby opening and closing one of each pair of a gas outlets (14) or (14') ... and an atmospheric air inlet (15) or (15') ... by the longitudinal motion of the respective piston rod (17), (17') .... In the drawings, reference numeral (20) designates a compressed air inlet pipe, reference numerals (21), (21') designate electromagnetic valves, reference numeral (22) designates a gas outlet pipe communicating with the gas outlets (14), (14') ... , reference numeral (23) designates a rotary valve for the disposal of powdery dust, reference nummeral (24) designates the dust collector's frame, reference numeral (25) designates powdery dust, and reference numeral (26) designates a filter cloth exchange door.

The present invention is constructed as above with a plurality of compressed air pipes (13), (13') ... arranged longitudinally within each of the plurality of gas passages (9'), (9") ... connected with the compressed air inlet pipe (20) through electromagnetic valves (21), (21') ..., and the other end of this compressed air inlet pipe (20) connected by a pipe to a compressor (not shown). Compressed air is emitted from the compressed air outlets (12), (12') ... protruding from each compressed air pipe (13) (13') ..., toward venturi pipes (11) (11') ... respectively in each filter member (7), (7') ... at prescribed time intervals and within each gas passage (9'), (9") ... successively under the control of electromagnetic valves (21), (21') ... inserted into the compressed air pipes (13), (13') respectively, so that the filter cloth (6) is expanded rapidly and vibrated slightly so as to separate the powdery dust adhering to the outer forces of the filter members (7), (7') ....

Gas outlets (14), (14') ... and atmospheric air inlets (15) (15') ..., provided opposite each other in the gas flow passages (9'), (9"), ... respectively, are arranged so that either one of these sets of holes is always closed by the gas outlet closing valve (18), (18') ... or the atmospheric air inlet closing valve (19), (19') ... respectively attached to the end of the piston rods (17), (17'), ... facing each other. When powdery dust is separated from a gas and removed, the atmospheric air inlet closing valves (19), (19') ... attached to the end of the piston rods (17), (17') ... , respectivly, are pushed over the atmospheric air inlets (15), (15') ... respectively, so as to close them, while outlet closing valves (18), (18') ... attached adjacent to the inlet closing valves (19), (19'), ... respectively, are displaced from the gas outlets (14), (14'), ... respectively, so as to open them, and the gas containing powdery dust is sucked in through the suction pipe (2) by a blower provided in the gas outlet pipe (22) and this gas is filtered through the filter members (7), (7') ... and then discharged. When atmospheric air is then introduced through the atmospheric air inlets (15), (15'), which are opened, air cylinders (16), (16') ... are operated simultaneously so as to close the gas outlets (14), (14') ... by the outlet closing valves (18), (18'), ... respectively, and the atmospheric air inlets (15), (15') ... at the opposite side are opened so as to introduce atmospheric air into the gas passages (9'), (9"), ... respectively.

Figure 6:
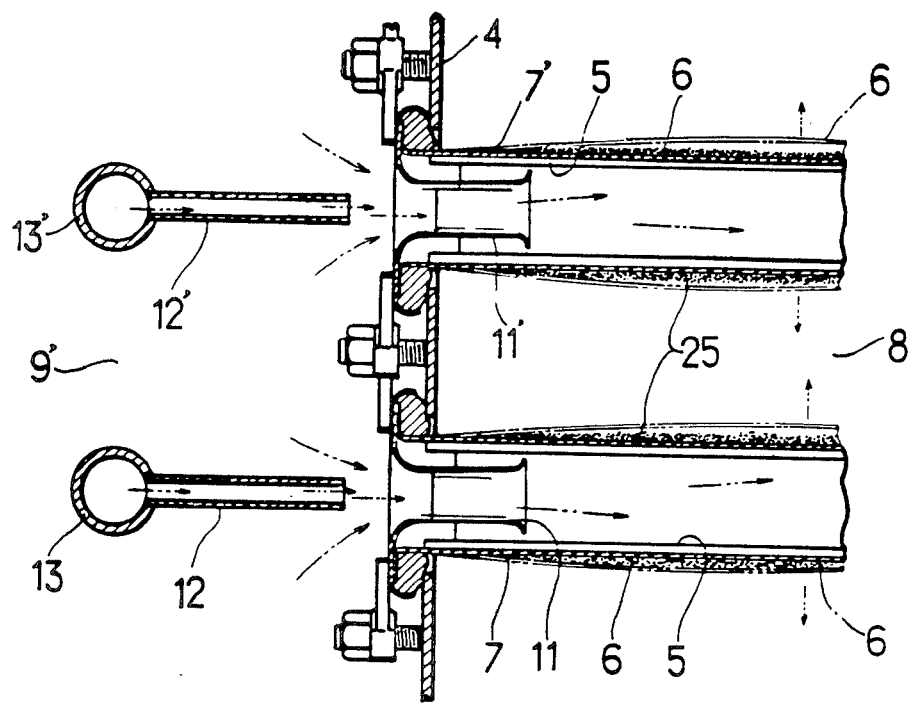
FIG. 6 is a cross-sectional view taken along the line VI-VI in FIG. 5.

The sequence for separating powdery dust in a dust collector according to the present invention will now be explained. By opening the gas outlets (14), (14') ... at the lower end of the gas passages (9'), (9"), ... respectively, gas containing powdery dust is introduced into the filter chamber (8) of the dust collector (1) from the suction pipe (2) arranged at the upper end of the dust collector by a blower provided within the gas outlet pipe (22), and said gas containing the powdery dust is filtered by the filter cloth (6) covering the filter members (7), (7') ... then passes through longitudinally subdivided gas flowing passages (9'), (9") ... from the openings at the end of the filter members (7), (7') ... and is then discharged from gas outlets (14), (14') .... As the gas containing the powdery dust is filtered, minute particles of powdery dust (25) gradually build up on the outer face of the filter cloth (6) and the gas-filtering properties of the filter members (7), (7') ... decrease with time. Air cylinders (16), (16') ..., used as gas-separating means, provided outside the lower end of the respective gas passages (9'), (9"), ... are operated individually in succession at definite time intervals so as to close each of the gas outlets (14), (14') ... by the respective outlet closing valve (18), (18') then the atmospheric air inlet closing valves (19), (19') ... attached behind said valves (18), (18') ... are removed from the respective atmospheric air inlets (15), (15') ... and atmospheric air is introduced. At this time, the gas within the one of the passages (9'), (9") ... corresponding to the operating one of air cylinders (16), (16') ... is passing from the filter chamber toward this gas passage through the corresponding filter members (7), (7') ... in spite of the rapid closing of the corresponding one of the gas outlets (14), (14') .... Accordingly, the air within this gas passage attains a partial vacuum, but since the corresponding one of the atmospheric air inlet (15), (15') ... is opened as the corresponding one of gas outlets (14), (14') ... is closed, atmospheric air is introduced so that the partial vacuum disappears, and the gas flow is stopped instantaneously because it becomes identical to the remaining gas flow. When compressed air is rapidly injected at high pressure from the compressed air outlets (12), (12') . . . toward the venturi tubes (11) (11') . . . respectively, said high pressure air is at a higher pressure than the atmospheric air introduced from the corresponding one of the atmospheric air inlets (15), (15') . . . and so pressurizes the interior of the corresponding filter members (7), (7') . . . thereby, as shown in FIG. 6, rapidly expanding and vibrating slightly the filter cloth (6) so that powdery dust (25) built up on the outer face of the filter cloth is separated and drops. Thus, compressed air is ejected in succession from the gas flowing passages (9'), (9") . . . , thereby dropping separated powdery dust (25) into the powdery dust disposal chute (3), and the atmospheric air inlets (15), (15') . . . are successively closed by operating the air cylinders (16), (16') . . . again and the discharge of gas from the gas outlets (14), (14') . . . are successively started again. Since this series of powdery dust separating processes are performed in succession in a cycle involving each gas passage (9'), (9") . . . , it has the advantage that a definite flow rate of filtered gas is always obtained from the other gas passages.

In the present invention, the gas chamber divided from the filter chamber in the usual type of dust collector is further subdivided longitudinally so as to form a plurality of vertical gas passages and protruding compressed air outlets are provided in each passage and flat box-like filter members are inserted opposite to said ports. Accordingly, the amplitude of the filter members' movement by the compressed air is larger than that of the usual cylindrical type of filter member and thereby the efficiency of separating powdery dust is also higher, and since atmospheric air inlets are provided at the lower end of each gas passage beside the gas outlet passage, and atmospheric air is added to the ejected compressed air without causing pressure losses by opening and closing said ports in succession individually and alternately, the filter members are efficiently expanded and vibrated slightly, and an effective and sure separation of powdery dust can be performed compared with the quantities of compressed air injected. Thus this apparatus is extremely useful.

What is claimed is:

1. A powdery dust separating apparatus comprising:
   a. a dust collector body, said body having an interior space, said body including:
      (1) means for separating said interior space into a filter chamber, and a gas chamber, laterally spaced from said filter chamber,
      (2) means for directing powdery dust containing gas into the top end of said filter chamber, and
      (3) means, at the lower end of said filter chamber, for directing powdery dust separated from said gas out of said filter chamber;
   b. a plurality of mutually spaced filter members, each having spaced vertically extending outer faces covered by filter cloth and an opening in an end thereof between said outer faces;
   c. a plurality of vertically extending separators separating said gas chamber into a plurality of vertically extending gas passages, said gas passages each communicating with said opening of at least one of said plurality of filter members and including a gas outlet at the lower end thereof and an atmospheric air inlet opposite said gas outlet;
   d. means for injecting compressed air separately into each of said filter members between said outer faces through said openings; and
   e. valve means in each of said plurality of gas passages, for alternatively respectively closing said gas outlet while opening said atmospheric air inlet and closing said atmospheric air inlet while opening said gas outlet.

2. An apparatus as in claim 1, wherein said valve means comprises an air cylinder having a piston rod reciprocally longitudinally movable therein, an outlet closing valve and an atmospheric air inlet closing valve attached to an end of said piston rod so as to alternately respectively close said gas outlet while opening said atmospheric air inlet and closing said atmospheric air inlet while opening said gas outlet with reciprocal movement of said piston rod.

3. An apparatus as in claim 1, wherein said plurality of filter members extend vertically and laterally in longitudinally spaced parallel relation, said separators being spaced, said opening of each of said plurality of filter members opening into a corresponding one of said plurality of gas passages.

4. An apparatus as in claim 3, wherein said injecting means comprises compressed air pipes within said plurality of gas passages having air outlets protruding therefrom facing the openings of said plurality of filter members.

5. An apparatus as in claim 4, further comprising venting tubes attached to said openings directly facing said air outlets.

6. A powdery dust separating apparatus, comprising:
   a. a dust collector body, said body including:
      (1) a vertically and longitudinally extending partition therein dividing the interior of said body into a filter chamber, and a gas chamber laterally spaced from said filter chamber,
      (2) conduit means at the upper end thereof communicating with said filter chamber, for directing powdery dust containing gas into said filter chamber, and
      (3) dust disposal conduit means at the lower end thereof communicating with said filter chamber, for directing therethrough powdery dust separated from the gas;
   b. mutually parallel, longitudinally spaced, vertically and laterally extending filter members disposed in said filter chamber and inserted into said partition, said filter members each having filter cloth spread over the outer faces thereof and having openings in ends ttherehof adjacent said partition;
   c. a plurality of separators longitudinally separating said gas chamber into a plurality of gas passages, said gas passages each including a gas outlet at the lower end thereof and an atmospheric air inlet opposite said gas outlet;
   d. means for injecting compressed air separately into each of said filter members between said outer faces through said openings; and
   e. valve means in each of said gas passages, for alternately respectively closing said gas outlet while opening said atmospheric air inlet and closing said atmospheric air inlet while opening said gas outlet.

* * * * *